Jan. 30, 1962  G. WITTBRODT  3,018,493
BABY BED PLAY PEN
Filed June 9, 1960
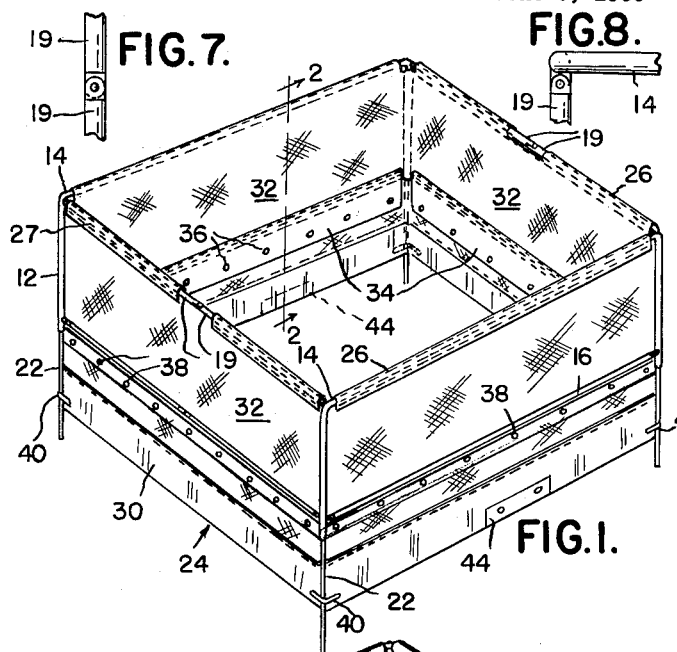
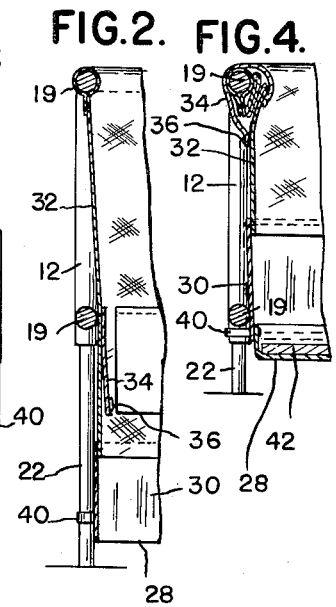
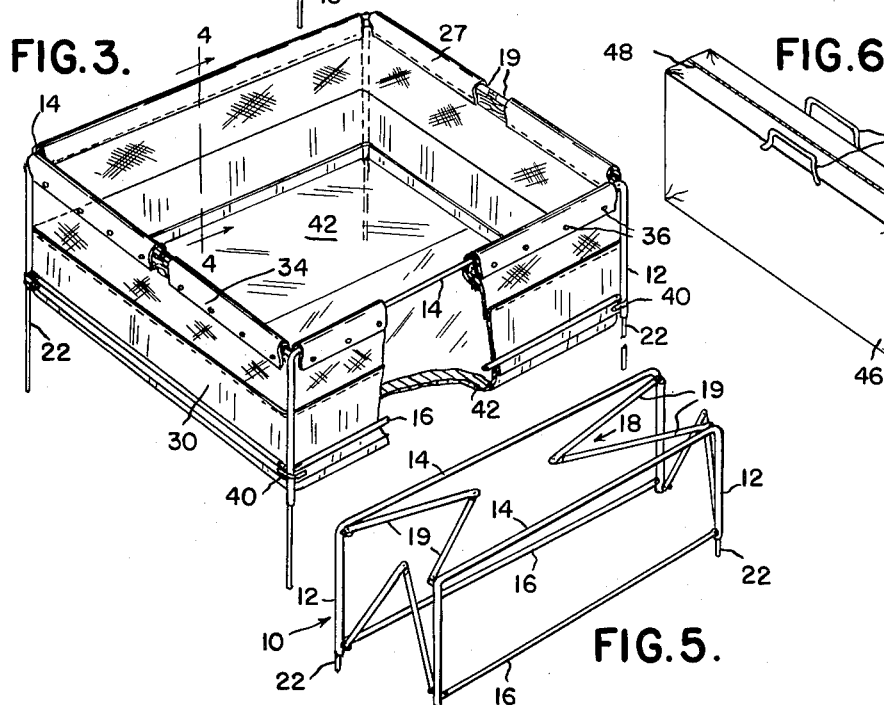
INVENTOR.
GERTRUDE WITTBRODT
BY Whittemore, Hulbert
and Belknap
ATTORNEYS

United States Patent Office 3,018,493
Patented Jan. 30, 1962

3,018,493
BABY BED PLAY PEN
Gertrude Wittbrodt, 11573 Whithorn, Detroit, Mich.
Filed June 9, 1960, Ser. No. 35,027
1 Claim. (Cl. 5—99)

The present invention relates to a multiple purpose baby bed-play pen. More particularly, this invention relates to a combination portable traveling baby bed-play pen unit which is so constructed that it may be collapsed into a relatively small amount of space to form a substantially rectangular package which may be conveniently carried in a traveling case.

This invention specifically relates to an improved baby bed-play pen which is portable, collapsible, convertible, and adapted for a plurality of uses. The unit is specifically designed of lightweight material which makes it easily adaptable for handling and for carrying purposes. The portable traveling unit may be used inside a house on the floor or on a bed as a baby bed and/or play pen. In addition, the unit can also be used as a car bed when traveling. It further may be utilized outdoors on the ground for the same purposes as when utilized indoors.

In carrying out my invention, I provide a frame which has telescopic legs therein so that the frame may be moved vertically to a plurality of positions.

A flexible, lightweight basket is provided on the interior of the hollow frame and has the upper edges thereof secured to the horizontal frame members so as to properly support the basket a suitable distance above the supporting surface. The flexible basket consists of a relatively solid piece of material such as canvas which includes a bottom and side wall portions and a relatively open piece of material such as nylon mesh net which includes side wall portions adapted to be connected to the canvas wall portions.

Canvas flaps are provided on the inner periphery of the walls for a purpose to be subsequently described. Fastening means, such as gripper snaps, are provided on the flaps for the specific purpose of retaining the nylon mesh net in a "rolled-up" manner when the unit or the basket is reduced in height. When this occurs, the flaps are lifted upwardly to raise the bottom of the basket on the frame. The nylon mesh is folded back and forth on itself and the flaps are moved around the top horizontal supporting members so as to retain the "rolled-up" nylon mesh net and to engage complementary securing or fastening portions connected to the outside surfaces of the walls of the net.

When the basket has been reduced in height, the net is retained in a novel manner so as to provide a neat appearing and attractive unit.

It is an object of the present invention to provide a portable baby bed-play pen unit which is simple in design, lightweight and economical in construction and which is particularly easy to set up for use and to disassemble or collapse when it is desirable to transport or move the unit.

Another object of the invention is to provide a foldable unit which is designed so that it may be collapsed into a substantially rectangular package that may be easily transported in a traveling bag or case.

Still another object of the invention is to provide a flexible basket appropriately supported by the frame, said basket having a plurality of flaps on the interior of the basket which are adaptable for retaining side portions of the basket when the basket is reduced in height.

A further object of the invention is to provide a foldable, rectangular frame having a flexible rectangular basket on the interior of the frame which is appropriately carried by the top horizontal members of the frame.

A still further object of the invention is to provide a foldable, rectangular frame having a flexible rectangular basket on the interior of the frame which is appropriately carried by the top horizontal members of the frame, said basket having a flap on the inner surface of each wall of the basket.

Another object of the invention is to provide a foldable, rectangular frame having a flexible rectangular basket on the interior of the frame which is appropriately carried by the top horizontal members of the frame, said basket having a flap on the inner surface of each wall of the basket, said flaps being adaptable for retaining the upper portion of the walls when the basket is reduced in height.

Still another object of the invention is to provide a foldable, rectangular frame having a flexible rectangular basket on the interior of the frame which is appropriately carried by the top horizontal members of the frame, said basket having a flap on the inner surface of each wall of the basket, said flaps having fastening means thereon and being adaptable for retaining the upper portion of the walls when the basket is reduced in height by folding the upper portions of the walls while simultaneously moving the flaps around the top horizontal members and connecting the fastening means with complementary portions on the outside of the basket walls.

FIGURE 1 is a perspective view of the baby bed-play pen having the sides thereof in an extended position.

FIGURE 2 is a sectional view taken on line 2—2 of FIGURE 1.

FIGURE 3 is a perspective view of the baby bed-play pen having the sides thereof in reduced position.

FIGURE 4 is a sectional view taken on line 4—4 of FIGURE 3.

FIGURE 5 is a perspective view of the tubular frame, shown in a partly collapsed position.

FIGURE 6 is a view of the traveling case in which the foldable baby bed-play pen is readily insertable.

FIGURE 7 is a top view of the hinge construction utilized between the two parts forming one of the top horizontal members of the frame shown in FIGURE 1.

FIGURE 8 is a view of the joint between a pair of horizontal members of the frame.

The supporting framework of the present invention consists essentially of a rectangular main frame which is collapsible about the central longitudinal axes. As shown in FIGURE 5, the frame 10 includes a pair of laterally spaced, U-shaped members bent to form the vertical legs 12 and the top horizontal bracing members 14. A pair of longitudinal braces 16 are connected to the bottom of the legs 12 parallel to the horizontal bracing members 14. Means for connecting the U-shaped longitudinal members include a pair of upper and lower linkages 18 which are connected at the outer ends to the legs 12. Each linkage 18 includes a pair of side members 19 which are pivotally connected at their inner ends as is best shown in FIGURES 5 and 7. The vertical pivot axes of the linkages 18 lie in the plane of the central longitudinal axis of the unit.

Telescopically disposed within each of the vertical legs 12 is a leg extension member 22. The extension members 22 are in an extended position as shown in FIGURES 1 and 2 and are in a retracted position as is shown in FIGURES 3 and 4.

Referring now to FIGURE 1, there is shown a substantially rectangular lightweight basket 24 which is supported at its upper edges 26 by the top horizontal bracing members 14 a suitable distance above the supporting surface. The upper edges 26 may be reinforced by a stronger material, as an example, twillcloth plastic 27 which is carried by the top horizontal members 14 and 18. The basket 24 may be made from a flexible piece of material which includes the four side walls and the bottom. In the specific embodiment, the flexible basket consists of a relatively solid piece of material such as canvas which includes a bottom 28 and side wall portions 30 and a relatively open piece of material such as nylon mesh net which includes wall portions 32, the lower edges of which are secured to the upper edges of the canvas wall portions 30. A flap 34 made from a suitable piece of material, as an example, canvas, is provided on the inner periphery of the wall portions 32. The canvas basket and the nylon wall portions 32 are connected by sewing. The flaps 34 are also sewed to the nylon mesh material.

Fastening means such as gripper snaps 36 are provided on the loose longitudinal edge of the flaps 34. Holding means 38 for securing the snaps 36 are provided on the outside walls as is best illustrated in FIGURE 1. When the unit is in an extended position, as shown in FIGURE 1, the flap is adapted to lie in proximity to the inner surface of the walls.

As is shown in the drawings, the flexible basket is positioned on the inside of the frame 10. Straps 40 hold the lower portion of the basket adjacent to the legs 22 in such a manner that the basket may freely move with reference to the legs 22. When it is desirable to lower the unit or to raise the bottom 28 into the position shown in FIGURE 3, the canvas basket is moved upwardly, thereby creating a surplus of nylon net material which is folded back and forth on itself in a serpentine path, or is "rolled up" in a suitable manner while the flaps 34 are simultaneously moved around the horizontal supporting members 14 and 18. The flaps 34 hold the excess material, thereby providing a neat and attractive appearance.

A suitable hinged floor 42 is placed on the bottom of the basket. The floor 42 may be made from Masonite which has a cotton or plastic pad thereon on which the child rests. Straps, not shown, are provided underneath the bottom 28 and hidden inside the pair of pockets 44. The straps may be used for safety purposes when the unit is placed on top of a full size family bed. In addition, the straps may also be used to secure the unit in a station wagon when used as a play pen. In the last example, the straps are connected to part of the vehicle to hold the play pen from moving.

This invention has many unique features which make it suitable for a plurality of purposes. The unit can be used in the home or outdoors as a bed and play pen. In addition, it may be carried in an automobile.

As an example, the frame 10 may be constructed from one-inch, tubular aluminum material. The frame, when fully expanded, stands at a height of 26 inches. The extension members 22 may be telescoped inwardly to reduce the height of the unit to 16 inches. This construction makes it adjustable to two positions. When used in the back seat of an automobile, only two of the legs are required to be shortened.

All of the material is lightweight, including the aluminum frame, nylon mesh, canvas and the twillcloth leatherette used to join the nylon mesh to the top horizontal tubular members. The flexible materials are washable and can be scrub cleaned and hosed. The canvas material protects the bady from drafts.

For a newly born baby, the unit is used as a bed with the legs extended, as the example, 26 inches, and the basket raised off the floor approximately ten to twelve inches. When in this position, the flaps 34 are retaining the excess net material and are secured to the outer periphery of the walls. When the baby reaches an age where it can stand and perhaps walk, the gripper snaps are unsnapped, thereby lowering the basket to an inch or so above the supporting surface. When in the last described position, the unit may serve as a play pen.

When it is desirable to fold the unit, the extension members are initially moved inwardly to assume the position shown in FIGURE 3. The unit is then folded about the longitudinal hinge plane, with the linkages 18 moving inwardly as shown in FIGURE 5. The entire unit, including the frame 10, floor 42, and the flexible basket, reduces to a width of six inches. The folded unit is insertable in a traveling case 46 which is provided with a zipper 48 and handles 50 for conveniently carrying the folded unit.

As mentioned previously, the baby bed-play pen may be utilized for various purposes and is designed for both outdoor and indoor use. The size and the shape of various parts and the material employed may be varied and changes may be made in the structure shown and discussed herein, within the scope of the claim, without departing from the basic principles of my invention.

The drawings and the foregoing specification constitute a description of baby bed-play pen in such full, clear, concise and exact terms as to enable any person skilled in the art to practice the invention, the scope of which is indicated by the appended claim.

What I claim as my invention is:

A multiple purpose, self-supporting, foldable baby crib comprising a frame including a pair of longitudinally extending, rectangularly shaped rigid side members made from tubular material, said members each including upper and lower horizontal rails and a pair of vertical elements which are adapted to receive legs which telescope therein to adjust the height of the crib above the supporting surface and a pair of upper and lower tubular end rails connecting said side members and arranged in the form of linkages, said linkages each comprising a pair of links having their inner ends pivoted together and their outer ends pivoted to said side members, a basket made from lightweight material carried entirely by said upper rails, said basket including side and end walls and a bottom, said walls having their outer edge portions connected to the upper rails of the frame for supporting said basket a suitable distance above the supporting surface, means for adjusting the depth of said basket, said means including a flap extending longitudinally along the inner surface of each of said side walls and connected on one longitudinal edge to the side wall along a line which lies in a horizontal plane containing said lower rails, said flap being adapted to be lifted and carried over the upper rail corresponding to the side wall for folding the excess material in a serpentine path and thereby arranging the folded excess material in an elongated bundle, and fastening means including a plurality of gripper snaps along the other longitudinal edge of the flap for securing the flap to the outer surface of the corresponding side wall, thereby firmly holding the bundle against the corresponding rail.

References Cited in the file of this patent
UNITED STATES PATENTS

| | | |
|---|---|---|
| 2,277,406 | Mahr | Mar. 24, 1942 |
| 2,493,181 | Andersen | Jan. 3, 1950 |
| 2,698,443 | Ralick | Jan. 4, 1955 |